March 18, 1930.  J. C. BELDEN  1,751,386
FLOOR CORD
Filed July 7, 1928
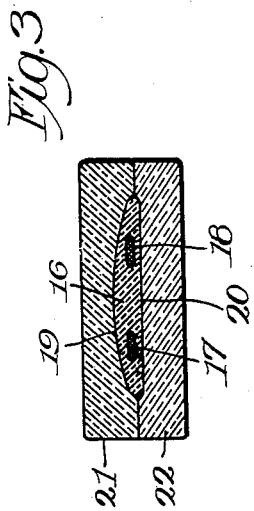
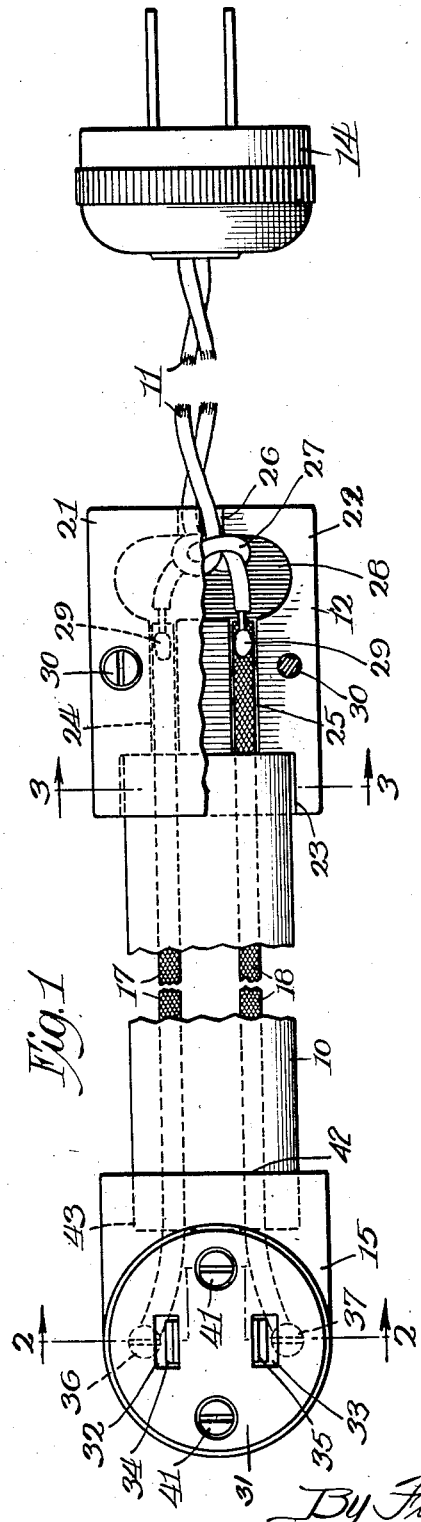
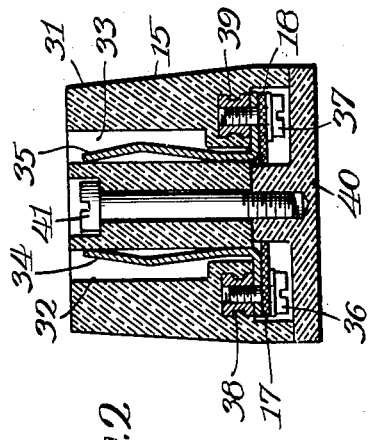
Inventor
Joseph C. Belden
By Fisher, Clapp, Soans & Pond Attys.

Patented Mar. 18, 1930

1,751,386

UNITED STATES PATENT OFFICE

JOSEPH C. BELDEN, OF CHICAGO, ILLINOIS, ASSIGNOR TO BELDEN MANUFACTURING COMPANY, OF CHICAGO, ILLINOIS, A CORPORATION OF ILLINOIS

FLOOR CORD

Application filed July 7, 1928. Serial No. 290,949.

My invention relates to floor cords or extension wires which are adapted to be positioned on the floor and concealed by a rug or analogous floor covering, the cord serving to conduct electric current from an electric outlet to an electric fixture disposed at a point in the room which is remote from the electric outlet.

The principal object of the invention is to provide a floor cord which is adapted to be positioned on the floor and to be concealed by a rug or other floor covering disposed thereover, without noticeably or objectionably bulging the floor covering over the cord.

Other objects of the invention are to provide an improved floor cord of the class described which is portable and which may be disposed on the floor and under the rug in any desired position so as to be effective to conduct electric current from an outlet to a fixture located at any remote point in the room; to provide such a cord which will lie flat on the floor and will not tend to twist; to provide a cord having a part suitably ornamented so as to present a pleasing appearance, while another part which is adapted to be concealed by the floor covering is of relatively plain appearance; to provide means for conveniently electrically connecting the different forms of conductors used in making up the floor cord; to provide convenient means for facilitating electrical connection of the floor cord to a standard electric outlet; to provide means for facilitating connection of an electric fixture to the outlet end of the floor cord; and in general, it is the object of the present invention to provide an improved floor cord of the class described.

Other objects and the advantages of the invention will be understood by reference to the following specification and accompanying drawing in which I have illustrated a floor cord embodying a selected form of my invention.

On the drawing:

Fig. 1 is a plan, parts being broken away to facilitate illustration.

Figs. 2 and 3 are sections on the lines 2—2 and 3—3 respectively of Fig. 1.

Referring now to the drawings, my improved floor cord comprises a flat duplex conductor cord portion 10, a length of standard duplex cord 11, a casing 12 for housing the conductors of the cords 10 and 11, a plug connector 14 connected to the end of the duplex conductor 11 for facilitating connection thereof to an electric outlet such as a wall socket, and a connector 15 connected to and housing the outlet end of the conductors of the cord 10 for facilitating connection thereto of an electric fixture, for instance, a floor lamp.

The duplex floor cord 10 in the present instance preferably consists of a strip of insulating material 16, such as rubber or the like in which a pair of parallel, relatively flat conductor wires 17 and 18 are embedded in spaced relation so as to be insulated from each other. The conductor wires 17 and 18 are preferably formed of braided copper wire so that they will be flexible and thereby capable of being bent into any desired shape. The use of braided wires 17 and 18 is also desirable in that the relatively rough surface of the wires incident to braiding of the finer wires permits the insulating material 16 to grip the wires 17 and 18 and thereby prevent the same from slipping within the insulating strip.

As clearly shown in Fig. 3, the strip 16 is of relatively wide but thin cross section having a rounded or arched top surface 19 and a flat bottom surface 20. This formation is advantageous in that the thickness of the cord tapers from its maximum thickness adjacent the center of the cord to a materially reduced thickness at the opposite edges of the cord. It will be apparent that when a strip having such a cross section is positioned on a floor and underneath a rug or other floor covering, that the rug will not be material raised above its normal height, or in other words that no objectionable bulging of the rug will be occasioned by the floor cord.

The floor cord 10, is, as above noted, adapted to be positioned flat on the floor and extended underneath a rug from one side of a room adjacent an electric outlet, such as a wall socket, to another part of the room, for instance, at the opposite side of the rug. The flatness of the cord will obviously be effective to prevent the cord from twisting.

For connecting the end of the floor cord which is disposed adjacent the outlet fixture, the duplex lamp cord 11 is provided, the connector 14 being provided at the end of the lamp cord in a well known manner for connecting the duplex cord to the wall socket. The connector 14 may of course, be of any desirable type of connector, a two prong or male type of plug connector being here shown. The other ends of the conductors of the lamp cord 11 are connected respectively to the conductors 17 and 18 of the duplex cord 10, a suitable casing being provided to enclose the connection.

This casing, indicated at 12, in the present embodiment consists of upper and lower body parts 21 and 22 which are recessed as shown at 23 in Fig. 1, to receive the end of the duplex conductor cord 10, and as shown at 24 and 25, to receive the conductors 17 and 18. The other end of the casing 12 is recessed as indicated at 26 to receive the duplex lamp cord 11, the same being knotted as shown at 27 to prevent the cord from being pulled out of the casing. The casing is recessed as shown at 28 to receive the knot and respective end portions of the conductors. The conductors of the lamp cord 11 and of the duplex cord 10 may be electrically connected in any suitable manner, for instance, by soldering as shown at 29.

I may of course, provide means for separably connecting the said conductors but under some circumstances I find it desirable to permanently connect the conductors by such means as soldering. The top and bottom portions 21 and 22 of the casing 12 may be secured together in any suitable manner, as for instance, by means of screws 30—30. The casing 12 may be made of any suitable material and finished in such a manner that it will present a neat and attractive appearance, and the same is adapted to be positioned adjacent the edge of the rug so that no part of the flat floor cord or strip 10 will be visible. I have found that in cases where the rug is provided with a fringe, the casing may be conveniently located in the fringe and its presence thereby obscured. The lamp cord 11 is preferably provided with an ornamental covering of suitable material such as braided silk. This cord portion extends from the casing 12 located at the edge of the rug to the wall socket or other convenient outlet, and under ordinary circumstances is of course exposed to view, for which reason it is preferably provided with the said ornamental covering.

The other end of the flat floor cord or strip 10 is preferably provided with the above mentioned connector 15 which in the present instance constitutes the female part of a separable connector. This connector consists of a main body portion 31 having apertures 32 and 33 in which contact prongs 34 and 35 are disposed, the same being held in position in any suitable manner. As shown in Fig. 2, the contact prongs are provided with bent over end portions which are apertured to receive binding posts or screws 36 and 37 which threadedly engage nuts 38 and 39, the latter being embedded in the body part 31 of the connector. A bottom or closure part 40 is provided for cooperating with the body part 31 to enclose the binding posts 36 and 37, screw means such as 41 being provided for locking the body parts 31 and 40 together.

In the present instance, the connector 15 is provided with an offset portion 42 adjacent its lower end which is recessed as indicated at 43 to receive the outlet end of the conductor cord 10. The recess 43 is preferably of such dimensions and disposed partly in the body part 31 and partly in the body part 40 so that when the two body parts are secured together by the screw means 41, the end of the flat floor cord 10 will be clamped between the body parts as is also the case where the cord 10 enters the recess 23 in the casing 12. The conductors 17 and 18 are connected to the binding posts 36 and 37 as clearly shown in Figs. 1 and 2 so that the contact prongs 34 and 35 constitute terminals for the said conductors.

The length of the flat duplex floor cord 10 is preferably such that the connector 15 will also be disposed adjacent the edge of the rug so that no part of the adjacent end of the flat conductor 10 will be visible. Any fixture, such as a floor lamp, provided with a male type connector plug may obviously be connected to the conductors 17 and 18 by simply inserting the male plug into the connector 15.

I have thus provided a floor cord which is adapted to conduct electric current from a source of current such as a wall socket to a point in the room which is remote from the wall socket and which may be disposed on the far side of a path of travel disposed intermediate the wall socket and the fixture which it is desired to connect to the wall socket. By means of my improved floor cord, the necessity of a considerable length of extension or lamp cord disposed on the floor and extending around the room adjacent the walls may be avoided.

I am aware that the details of construction of the parts constituting my improved floor cord may be varied without departing from the spirit of the invention, the scope of which should be determined by reference to the following claims, the same being construed as broadly as possible consistent with the state of the art.

I claim as my invention:

1. As a new article of manufacture, an electric floor cord comprising a flat strip of insulating material having a pair of conductors embedded in and projecting at opposite ends thereof, a duplex conductor cord connected to one pair of projecting ends of the conductors, a connection member carried by the outer end of the duplex conductor cord, a casing detachably carried by one end of the strip and housing the connection between the duplex conductor cord and the conductors of the flat strip, and a connector detachably carried by the other end of the strip and provided with contacts connected to the projecting ends of the conductors of the strip, said connector housing the connection between the conductors of the strip and the contacts.

2. As a new article of manufacture, an electric floor cord comprising a flat strip of insulating material, conductors embedded in said strip and projecting at opposite ends thereof, a duplex conductor cord connected to the projecting ends of the conductors at one end of the strip, a multiple part casing detachably clamped upon said end of the strip and housing the connection between the conductors of the strip and the duplex conductor cord, a connection member at the outer end of the duplex conductor cord, and a multiple part connector detachably clamped upon the other end of the strip and provided with a pair of open-ended sockets containing contact prongs, the adjacent projecting ends of the conductors of the strip being connected to the prongs and housed within said housing.

JOSEPH C. BELDEN.